US012315661B2

(12) United States Patent
Ishida et al.

(10) Patent No.: US 12,315,661 B2
(45) Date of Patent: May 27, 2025

(54) MAGNETIC COMPACT AND INDUCTOR

(71) Applicant: Murata Manufacturing Co., Ltd., Kyoto-fu (JP)

(72) Inventors: Keiichi Ishida, Nagaokakyo (JP); Keita Muneuchi, Nagaokakyo (JP); Nobuyuki Fujisawa, Nagaokakyo (JP); Yoshinobu Kimura, Nagaokakyo (JP); Yoshihiko Hattori, Nagaokakyo (JP)

(73) Assignee: Murata Manufacturing Co., Ltd., Kyoto-fu (JP)

( * ) Notice: Subject to any disclaimer, the term of this patent is extended or adjusted under 35 U.S.C. 154(b) by 835 days.

(21) Appl. No.: 17/486,789

(22) Filed: Sep. 27, 2021

(65) Prior Publication Data

US 2022/0102036 A1 Mar. 31, 2022

(30) Foreign Application Priority Data

Sep. 30, 2020 (JP) ................................ 2020-166445

(51) Int. Cl.

| | |
|---|---|
| ***H01F 1/147*** | (2006.01) |
| ***H01F 17/04*** | (2006.01) |
| ***H01F 27/255*** | (2006.01) |
| ***H01F 27/28*** | (2006.01) |
| ***H01F 41/02*** | (2006.01) |

(52) U.S. Cl.

CPC .......... *H01F 1/147* (2013.01); *H01F 27/255* (2013.01); *H01F 27/28* (2013.01); *H01F 41/0246* (2013.01); *H01F 17/04* (2013.01); *H01F 2017/048* (2013.01); *Y10T 428/32* (2015.01)

(58) Field of Classification Search

CPC ... H01F 1/147; H01F 1/26; H01F 1/28; H01F 1/14708; H01F 1/14733; H01F 1/14741; H01F 1/1475; H01F 1/14758; H01F 1/14766; H01F 1/15366; H01F 1/15375; H01F 27/255; H01F 27/28; H01F 41/0246; H01F 17/04; H01F 2017/048; Y10T 428/32

See application file for complete search history.

(56) References Cited

FOREIGN PATENT DOCUMENTS

| | | | |
|---|---|---|---|
| CN | 103846426 | A | 6/2014 |
| CN | 108364767 | A | 8/2018 |
| JP | 2018-113436 | A | 7/2018 |
| JP | 2020-095988 | A | 6/2020 |

OTHER PUBLICATIONS

English translation of WO2018/179812 (Year: 2018).*
Translation of WO2018/179812.*

* cited by examiner

*Primary Examiner* — Holly Rickman
(74) *Attorney, Agent, or Firm* — Studebaker Brackett PLLC

(57) ABSTRACT

A magnetic compact includes first magnetic particles, second magnetic particles with larger particle sizes than the first magnetic particles, and a resin. The area ratios calculated for multiple regions of the magnetic compact have a standard deviation of 0.40 or less, where area ratio=(total area of first magnetic particles)/(total area of second magnetic particles).

13 Claims, 7 Drawing Sheets

MAGNETIC COMPACT AND INDUCTOR

This application claims benefit of priority to Japanese Patent Application No. 2020-166445 filed Sep. 30, 2020, the entire content of which is incorporated herein by reference.

BACKGROUND

Technical Field

The present disclosure relates to a magnetic compact and an inductor.

Background Art

Japanese Unexamined Patent Application Publication No. 2018-113436 discloses a core (magnetic compact) manufactured by using a metal powder having a particle size distribution obtained by mixing two particle groups with different average particle sizes and also discloses an inductor manufactured by using the core.

SUMMARY

The inventors of the present disclosure have noticed that existing magnetic compacts have an issue to be addressed and have found the need to take a measure against the issue. Specifically, the inventors of the present disclosure have found the following issue.

The core described in Japanese Unexamined Patent Application Publication No. 2018-113436 is formed of a mixture of particle groups with different average particle sizes. The mixing of the particle groups by a commonly known method reduces the dispersion and fluidity of particles with a larger average particle size and particles with a smaller average particle size. In the resin, less particles with a smaller average particle size are thus disposed in gaps between particles with a larger average particle size, resulting in an uneven distribution of the particles with a smaller average particle size and the particles with a large average particle size. This reduces the packing rate and thus makes it difficult to increase the magnetic permeability. As a result, the core described in Japanese Unexamined Patent Application Publication No. 2018-113436 fails to have a high magnetic permeability.

The present disclosure has been made in light of the above issue. Specifically, the present disclosure provides a magnetic compact and an inductor that both achieve high magnetic permeability.

The inventors of the present disclosure attempt to address the above issue by dealing with the issue in a new way, not in a way extending from existing techniques.

According to preferred embodiments of the present disclosure, a magnetic compact includes first magnetic particles, second magnetic particles with larger particle sizes than the first magnetic particles, and a resin, wherein area ratios calculated for a plurality of regions of the magnetic compact have a standard deviation of 0.40 or less, where area ratio=(total area of first magnetic particles)/(total area of second magnetic particles).

According to preferred embodiments of the present disclosure, an inductor includes a coil conductor and the magnetic compact at the winding core of the coil conductor.

Since the area ratios (the total area of the first magnetic particles)/(the total area of the second magnetic particles) calculated for a plurality of regions of the magnetic compact according to the present disclosure have a standard deviation of 0.40 or less, the magnetic compact has a high magnetic permeability.

Other features, elements, characteristics and advantages of the present disclosure will become more apparent from the following detailed description of preferred embodiments of the present disclosure with reference to the attached drawings.

BRIEF DESCRIPTION OF THE DRAWINGS

FIG. 2A is a perspective view, FIG. 2B is a plan view, and FIG. 2C is an a-a' cross-sectional view of FIG. 2A;

DETAILED DESCRIPTION

Figure 1A:
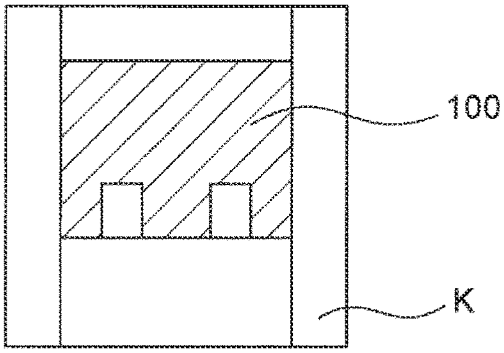
FIG. 1A and FIG. 1B are process views schematically illustrating a method for manufacturing a magnetic compact according to an embodiment.

Embodiments of the present disclosure will be specifically described below with reference to the drawings. The embodiments described below are for illustrative purposes only, and the present disclosure is not limited to the following embodiments.

Magnetic Compact

A magnetic compact according to an embodiment of the present disclosure will be described. The term "magnetic compact" as used herein refers to, in a broad sense, a magnetic compact used to increase the magnetic field in a magnetic field-generating device, such as an inductor, and refers to, in a narrow sense, a magnetic compact used to cover a coil (conducting wire) in an inductor or used as a core of a coil (conducting wire).

The materials used to manufacture the magnetic compact will be described. The materials used to manufacture the magnetic compact may include first magnetic material particles, second magnetic material particles, a resin, and a solvent, and/or a curing agent. The materials may further include additives, such as a lubricant.

The first magnetic material particles may be Fe-based metal magnetic particles used in the related art, and may be made of, for example, Fe (pure iron) or a Fe alloy. The first magnetic material particles may be particles made of at least one metal magnetic material selected from the group consisting of an alloy containing Fe and Ni, an alloy containing Fe and Co, an alloy containing Fe and Si, an alloy containing Fe, Si, and Cr, an alloy containing Fe, Si, and Al, an alloy containing Fe, Si, B, and Cr, and an alloy containing Fe, P, Cr, Si, B, Nb, and C, which are examples of the Fe alloy. The first magnetic material particles may have an insulated surface. For example, the first magnetic material particles may have an insulating coating on the surfaces. The insulating coating may be, for example, at least one insulating coating selected from the group consisting of an inorganic glass coating, an organic-inorganic hybrid coating, and an inorganic insulating coating formed by the sol-gel reaction of a metal alkoxide.

The second magnetic material particles may be Fe-based metal magnetic particles used in the related art, and may be made of, for example, Fe (pure iron) or a Fe alloy. The second magnetic material particles may be particles made of at least one metal magnetic material selected from the group consisting of an alloy containing Fe and Ni, an alloy containing Fe and Co, an alloy containing Fe and Si, an alloy containing Fe, Si, and Cr, an alloy containing Fe, Si, and Al, an alloy containing Fe, Si, B, and Cr, and an alloy containing Fe, P, Cr, Si, B, Nb, and C, which are examples of the Fe alloy. The second magnetic material particles and the first magnetic material particles may have the same composition or different compositions. The second magnetic material particles may have an insulated surface. For example, the second magnetic material particles may have an insulating coating on the surfaces. The insulating coating may be, for example, at least one insulating coating selected from the group consisting of an inorganic glass coating, an organic-inorganic hybrid coating, and an inorganic insulating coating formed by the sol-gel reaction of a metal alkoxide.

The resin may contain a functional group contributing to the curing reaction. In other words, the magnetic compact can be manufactured by means of curing of the resin through the curing reaction. The term "resin" as used herein may include not only a completely cured resin but also an uncured resin before the curing reaction. The resin may be, for example, at least one selected from the group consisting of epoxy resins, phenolic resins, polyester resins, polyimide resins, polyolefin resins, and silicone resins. The use of an epoxy resin as the resin can provide a magnetic compact having high electrical insulation and/or high mechanical strength. In different methods, thermoplastic resins, such as polyamide-imide, polyphenylene sulfide, and/or liquid crystal polymers, may be used. The curing reaction preferably proceeds with heat. In other words, the resin is preferably a thermosetting resin. Examples include thermosetting epoxy resins. The use of such a resin can cause the curing reaction by a simple method.

The solvent is used to form a slurry of a mixture of the above materials and is preferably an organic solvent. The solvent may include, for example, any one of aromatic hydrocarbons, such as toluene and xylene; ketones, such as acetone, methyl ethyl ketone, and methyl isobutyl ketone; alcohols, such as methanol, ethanol, and isopropyl alcohol; and glycol ethers, such as propylene glycol monomethyl ether and propylene glycol monomethyl ether acetate.

The curing agent may be used to cure the resin. The curing agent may include, for example, any one of imidazole curing agents, amine curing agents, and guanidine curing agents (e.g., dicyandiamide).

The lubricant may be used to improve the lubricity of the second magnetic material particles and the first magnetic material particles and improve the packing rate. The lubricant may be used to facilitate release from a mold at the time of molding. The lubricant may include, for example, any one of nanosilica, barium sulfate, and stearic acid compounds (e.g., lithium stearate, magnesium stearate, zinc stearate, and potassium stearate).

With regard to the weight percentages of the materials used in the method for manufacturing a magnetic compact, the first magnetic material particles and the second magnetic material particles may be about 94 wt % or more and about 98 wt % or less (i.e., from about 94 wt % to about 98 wt %) based on the total weight, and the resin and the curing agent may be about 1 wt % or more and about 5 wt % or less (i.e., from about 1 wt % to about 5 wt %) based on the total weight, with the remainder being the lubricant and the solvent. The ratio between the first magnetic material particles and the second magnetic material particles is preferably such that the weight of the first magnetic material particles:the weight of the second magnetic material particles=about 10:90 or more and about 50:50 or less (i.e., from about 10:90 to about 50:50). The ratio between the resin and the curing agent is preferably such that the weight of the resin:the weight of the curing agent=about 95:5 or more and about 98:2 or less (i.e., from about 95:5 to about 98:2).

Method for Manufacturing Magnetic Compact

Figure 1B:
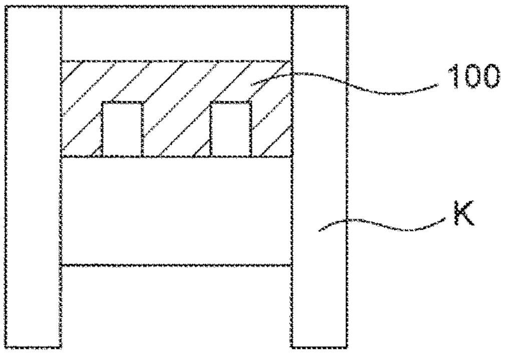
Figure 2A:
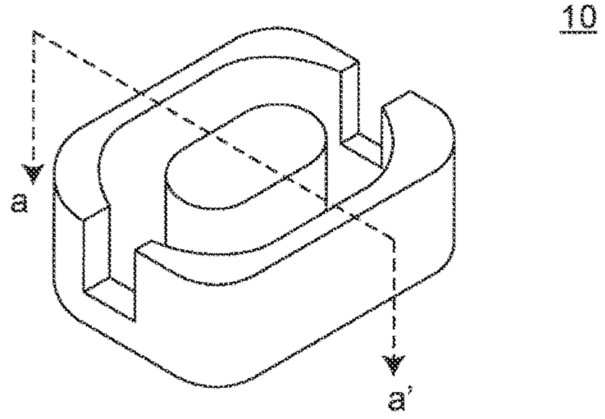
FIG. 2A, FIG. 2B, and FIG. 2C are views of a magnetic compact according to an embodiment, where
Figure 2B:
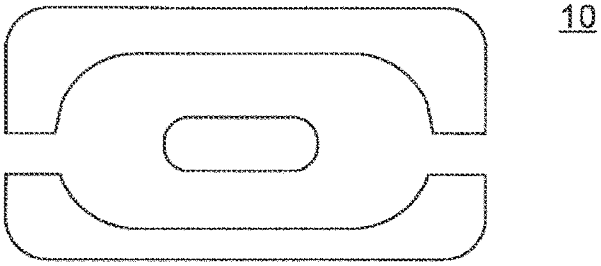
Figure 2C:
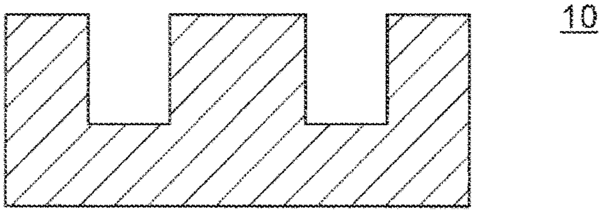

Next, a method for manufacturing the magnetic compact according to the embodiment of the present disclosure will be described with reference to FIGS. 1A and 1B and FIGS. 2A to 2C. FIG. 1A and FIG. 1B are process views schematically illustrating the method for manufacturing the magnetic compact according to the embodiment. FIG. 2A, FIG. 2B, and FIG. 2C are views of the magnetic compact according to the embodiment, where FIG. 2A is a perspective view, FIG. 2B is a plan view, and FIG. 2C is an a-a' cross-sectional view of FIG. 2A. The method described below is illustrative only, and the method for manufacturing the magnetic compact according to the embodiment is not limited to the following method.

First, the first magnetic material particles with smaller particle sizes and the second magnetic material particles with larger particle sizes are prepared. The first magnetic material particles and the second magnetic material particles may have an insulating coating on the particle surfaces. Examples of the method for forming the insulating coating include, but are not limited to, a mechanochemical method and a sol-gel method. The mechanochemical method costs less and is suitable particularly for forming a relatively thick insulating coating on particles with large particle sizes. When the insulating coating is formed by using the mechanochemical method, the thickness of the insulating coating can be controlled by controlling the amount of insulating material added. The sol-gel method can be used for a wide range of compositions and particle sizes and can form a relatively thin insulating coating. The sol-gel method can also form an insulating coating having a relatively high melting point. When the insulating coating is formed by using the sol-gel method, the thickness of the insulating coating can be controlled by adjusting, for example, the sol-gel reaction time and the amounts of metal alkoxide and solvent added. Among the prepared first magnetic material particles and second magnetic material particles, the second magnetic material particles are placed in a stirring vessel and stirred in the vessel.

Next, a particle material containing the first magnetic material particles with smaller particle sizes, a resin, a solvent, and a curing agent is mixed to form a slurry. The slurry is then placed in an atomizing device. Examples of the atomizing device include a device capable of atomizing liquid into a mist. Specific examples include a spray atomizing device. The material may contain a lubricant. In other words, the lubricant is not an essential component of the particle material. In the particle material placed in the atomizing device, the weight percentage of the solvent may be about 1.0 wt % or more and about 5.0 wt % or less (i.e., from about 1.0 wt % to about 5.0 wt %) based on the total weight of the materials used (the first magnetic material particles, the second magnetic material particles, the resin, the curing agent, and the solvent, and/or the lubricant).

Next, the particle material containing the first magnetic material particles is atomized, by using the atomizing device, over the second magnetic material particles being stirred in the stirring vessel. The term "atomizing" as used herein means ejecting liquid in a mist form. The atomizing is preferably performed at a temperature of about 30° C. or higher and about 80° C. or lower (i.e., from about 30° C. to about 80° C.) in the atmosphere or in an $N_2$ atmosphere. The solvent in the material may be evaporated by atomizing the first magnetic material particles over the second magnetic material particles at such a temperature. The atomizing of the particle material containing the first magnetic material particles over the second magnetic material particles by using the atomizing device causes even distribution of the first magnetic material particles around the second magnetic material particles. The first magnetic material particles and the second magnetic material particles thus tend to be evenly arranged during production of the magnetic compact, and the first magnetic material particles fill in gaps between the second magnetic material particles, which makes it difficult to form cavities. This can increase the packing rate of the first magnetic material particles and the second magnetic material particles. A precursor containing the first magnetic material particles and the second magnetic material particles is then stirred in the stirring vessel to form a uniform dispersion.

Subsequently, the precursor from which the solvent has been evaporated is shaken in a sieve shaker (mesh size: about 160 μm or more and about 300 μm or less=i.e., from about 160 μm to about 300 μm) to remove coarse particles, producing a magnetic powder. In the magnetic powder according to this embodiment, almost no curing reaction occurs in the resin. In other word, the resin is uncured or semi-cured. The term "magnetic powder" as used herein refers to a material in a particle form used to manufacture the "magnetic compact". In the magnetic powder, the first magnetic material particles are bonded around the second magnetic material particle through the resin. In this embodiment, an aspect in which the first magnetic material particles and the second magnetic material particles are contained is described. However, third magnetic material particles and fourth magnetic material particles, which have compositions and/or average particle sizes different from those of the first and second magnetic material particles, and other particles may be further used.

Next, a manufactured magnetic powder 100 is packed in a mold K (see FIGS. 1A and 1B). In this embodiment, the mold K is a mold for manufacturing an E-shaped core having an E-shape in sectional view. However, the mold is not limited to this type and may be, for example, a mold for manufacturing at least one selected from the group consisting of an I-shaped core, a T-shaped core, a plate-shaped core, and a toroidal ring-shaped core. The mold K in which the magnetic powder 100 has been packed may be introduced into a press molding machine (see FIG. 1A), and the magnetic powder 100 may be pressed in an environment at about 20° C. or higher and about 40° C. or lower (i.e., from about 20° C. to about 40° C.) at about 50 MPa or more and about 150 MPa or less (i.e., from about 50 MPa to about 150 Mpa) for about 30 seconds or less (see FIG. 1B). Although the magnetic powder 100 contains a thermosetting resin as described above, the curing reaction does not proceed because of a relatively low temperature from about 20° C. to about 40° C. at the time of pressing. The resin may be thus uncured or semi-cured. After pressing, the magnetic compact may be taken out of the mold.

A magnetic compact 10 according to this embodiment may be stored with the resin uncured or semi-cured. In other words, the semi-cured magnetic compact 10 may be packed in a mold different from the mold K when it is necessary to manufacture an almost completely cured magnetic compact as a product, and the resin may be cured in an environment at about 150° C. or higher and about 200° C. or lower (i.e., from about 150° C. to about 200° C.) at about 5 MPa or more and about 50 MPa or less (i.e., from about 5 MPa to about 50 Mpa) for about 60 seconds or more and about 1800 seconds or less (i.e., from about 60 seconds to about 1800 seconds), which are curing conditions for almost completely curing the resin, during manufacture of the magnetic compact (see FIGS. 2A to 2C). The magnetic compact may be produced by forming sheets containing the magnetic powder, stacking the sheets on top of one another, and pressure-bonding the stacked sheets, followed by heat curing.

Analytical Method for Magnetic Compact

Figure 3:
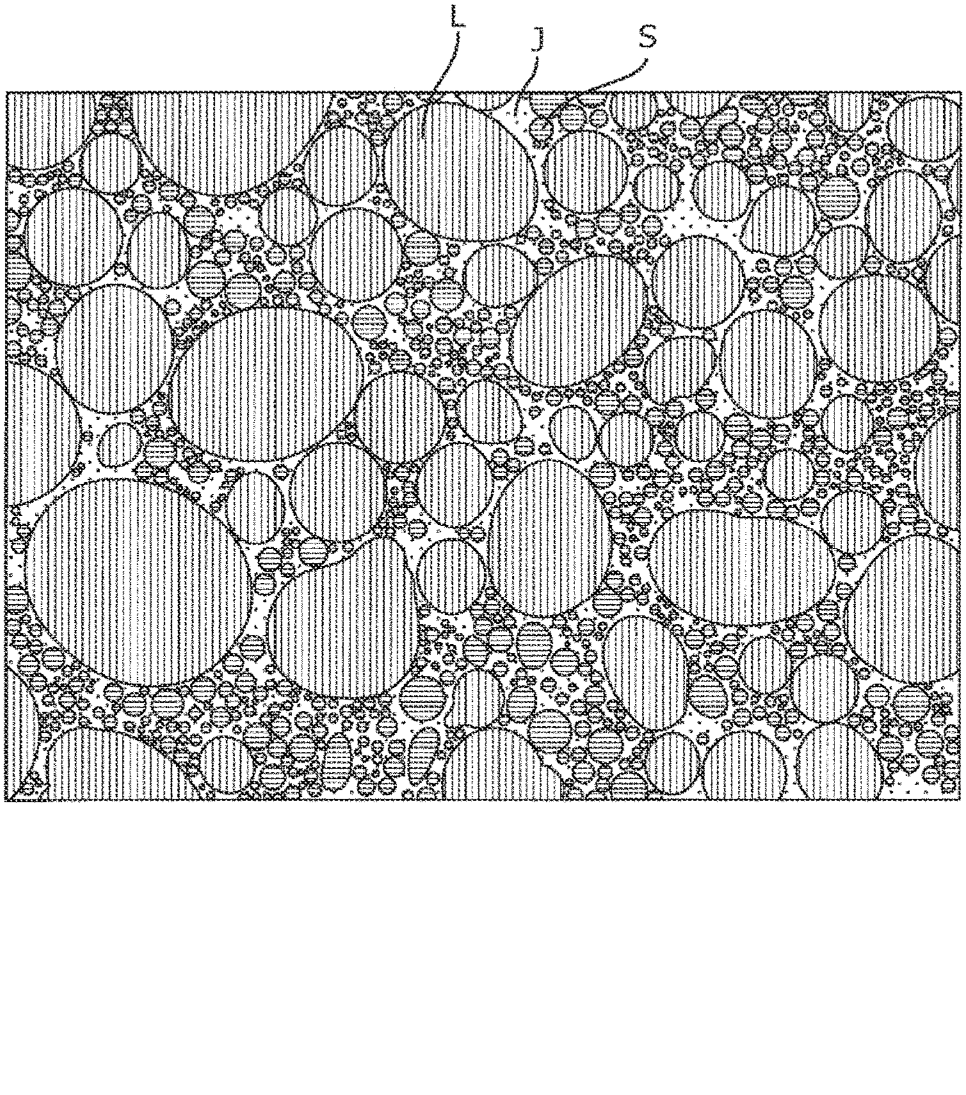
FIG. 3 is a schematic view of a cross-sectional SEM image of the magnetic compact according to the embodiment.
Figure 4:
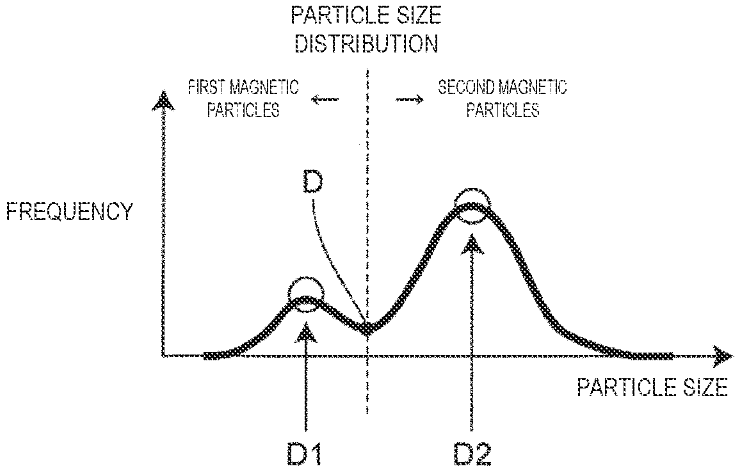
FIG. 4 is a graph illustrating the correlation between the frequency and particle size of the magnetic particles.
Figure 5:
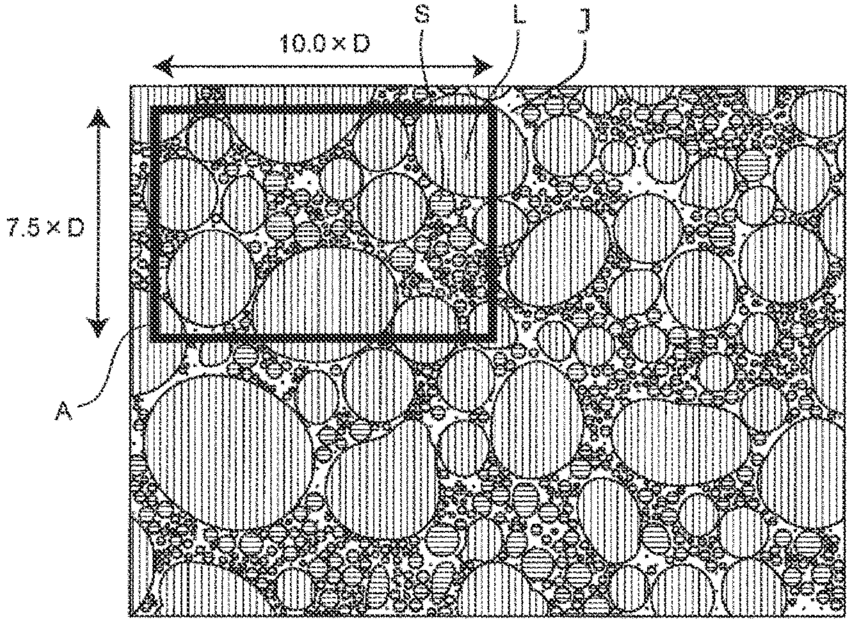
FIG. 5 is a view for describing the method for calculating the area ratio from the cross-sectional SEM image.

Next, an analytical method for the magnetic compact manufactured by the above manufacture method will be described with reference to FIGS. 3 to 5. FIG. 3 is a schematic view of the cross-sectional SEM image of the magnetic compact according to the embodiment. FIG. 4 is a graph illustrating the correlation between the particle size and frequency of the magnetic particles in the magnetic compact according to the embodiment. FIG. 5 is a view for describing the method for calculating the area ratio of the magnetic particles in the magnetic compact according to the embodiment. In FIG. 3 and FIG. 5, the reference character J indicates the resin.

The manufactured magnetic compact is analyzed mainly by using a scanning electron microscope (SEM). To obtain the cross-sectional SEM image, the fracture surface near the center of the magnetic compact is processed with an ion milling device, and the magnetic compact sample after processing is introduced into the SEM. The cross section is observed at about 500 times or more and about 2000 times or less (i.e., from about 500 times to about 2000 times). The schematic view of the obtained cross-sectional SEM image is shown in FIG. 3.

Furthermore, the obtained cross-sectional SEM image is analyzed by using image analysis software (WinROOF2018 available from MITANI Corporation), and the particle size distribution of the magnetic powder is obtained from the image analysis. Specifically, the particle size (equivalent circle diameter) of each particle is calculated by, for example, binarizing the obtained cross-sectional SEM image, and the shape of each particle is assumed to be a sphere having the calculated equivalent circle diameter. The frequency of each particle is counted to make a graph of the correlation between the volume-based particle size and the particle frequency, providing the particle size distribution. The graph obtained by the image analysis is shown in FIG. 4. According to the graph in FIG. 4, the manufactured magnetic powder has a first peak value and a second peak value higher than the first peak value in terms of particle frequency. There is a bottom value between the first peak value and the second peak value. The particle size corresponding to the bottom value is calculated as a particle size D. The number of peak values is not limited to two and may be three or more. Similarly, there may be multiple bottom values. When there are multiple bottom values, the particle size corresponding to the minimum bottom value is calculated as a particle size D. In the obtained particle size distribution, particles with particle sizes (equivalent circle diameters) smaller than the particle size D are defined as the first magnetic particles, and particles with particle sizes (equivalent circle diameters) larger than the particle size D are defined as the second magnetic particles. In this embodiment, the particle size D1 corresponding to the first peak value corresponds to the most frequent particle size of the first magnetic particles, and the particle size D2 corresponding to the second peak value corresponds to the most frequent particle size of the second magnetic particles. The particle size corresponding to the bottom value between the first peak value and the second peak value is defined as the particle size D.

As used herein, the term "first magnetic particles" refers to particles with particle sizes (equivalent circle diameters) smaller than the particle size D corresponding to the bottom value, and the term "second magnetic particles" refers to particles with particle sizes (equivalent circle diameters) larger than the particle size D corresponding to the bottom value. As used herein, the "most frequent particle size of the first magnetic particles" refers to the particle size at the highest particle size frequency in a particle size region smaller than the particle size D in the graph showing the correlation between the particle size and frequency of the magnetic particles in the magnetic powder, and the "most frequent particle size of the second magnetic particles" refers to the particle size at the highest particle size frequency in a particle size region larger than the particle size D in the graph showing the correlation between the particle size and frequency of the magnetic particles in the magnetic powder.

The most frequent particle size of the first magnetic particles in this embodiment is about 0.5 μm or more and about 8 μm or less (i.e., from about 0.5 μm to about 8 μm), more preferably about 1 μm or more and about 5 μm or less (i.e., from about 1 μm to about 5 μm). The second magnetic particles have larger particle sizes than the first magnetic particles. The most frequent particle size of the second magnetic particles is preferably about 10 μm or more and about 50 μm or less (i.e., from about 10 μm to about 50 μm). When the most frequent particle size of the second magnetic particles is about 50 μm or less, the eddy current loss can be reduced. The most frequent particle size of the second magnetic particles is more preferably about 20 μm or more and about 40 μm or less (i.e., from about 20 μm to about 40 μm). The ratio of (the most frequent particle size of the first magnetic particles)/(the most frequent particle size of the second magnetic particles) is preferably about 0.02 or more and about 0.5 or less (i.e., from about 0.02 to about 0.5). In this case, the packing rate of the magnetic particles is high. In the magnetic compact, the packing rate of the magnetic particles is preferably about 0.75 or more.

The area ratio of the first magnetic particles to the second magnetic particles is calculated by using the results of the cross-sectional SEM image of the magnetic compact (see FIG. 3) and the particle size distribution of the magnetic particles in the magnetic compact (see FIG. 4). The method for calculating the area ratio will be described below. In FIG. 3 and FIG. 5, the second magnetic particles L being large particles are indicated by vertical hatching, the first magnetic particles S being small particles are indicated by horizontal hatching, and the resin J is indicated by dotted hatching.

First, the analytical region A for analyzing the area ratio of the first magnetic particles S to the second magnetic particles L is set (see FIG. 5). The analytical region A is a region 10×D in length and 7.5×D in width, where D is a particle size. The analytical region A is not limited to this size, and a larger region may be analyzed. The total area of the first magnetic particles S and the total area of the second magnetic particles L in the analytical region A are calculated. These areas can be calculated by using the image analysis software. The area ratio of (the total area of the first magnetic particles S)/(the total area of the second magnetic particles L) is then calculated.

The area ratio is calculated at randomly selected 10 positions in the magnetic compact, and the standard deviation of the area ratios is calculated. In the magnetic compact according to this embodiment, the standard deviation is about 0.40 or less. The standard deviation is more preferably about 0.34 or less. The term "standard deviation" as used herein refers to a measure of variation of data. A smaller standard deviation means less variation.

In addition, the packing rate of the magnetic particles can be measured from the above cross-sectional SEM image. Specifically, the cross-sectional SEM image is obtained in the same manner as that for measuring the particle size distribution in the magnetic compact. The proportion of the area occupied by the magnetic particles with respect to the area of the observed region is determined by binarizing the obtained cross-sectional SEM image. The proportion of the area occupied by the magnetic particles with respect to the area of the observed region is determined at randomly selected 10 positions, and the average value of the proportions is defined as the packing rate of the magnetic particles. The packing rate of the magnetic particles can be measured accordingly. In this embodiment, an aspect in which the particle size distribution is obtained from the cross-sectional SEM image is described. The particle size distribution of magnetic particles in a powder form serving as a material can be determined by a laser diffraction method or a scattering method.

—Inductor—

Figure 6:
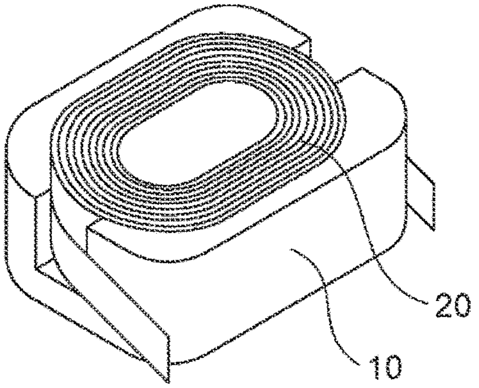
FIG. 6 is a process perspective view schematically illustrating a method for manufacturing an inductor according to an embodiment.
Figure 7:
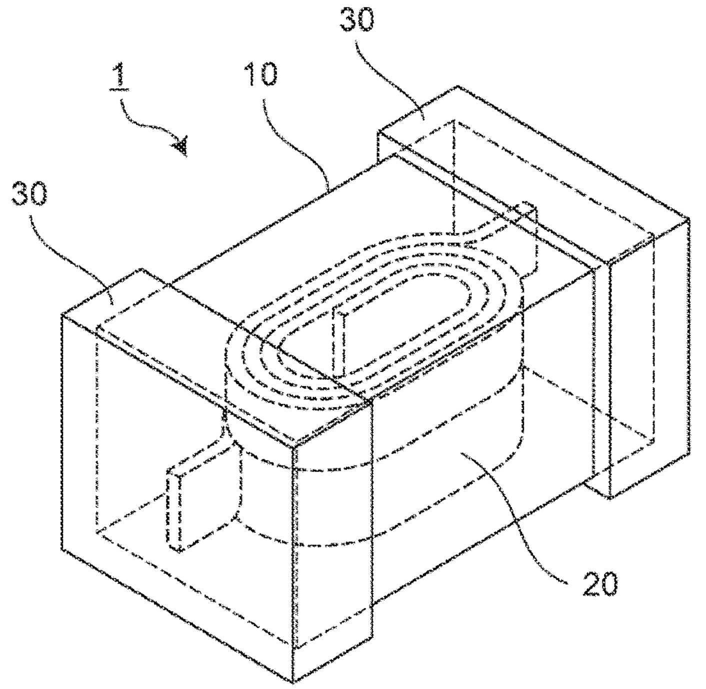
FIG. 7 is a perspective view of the inductor according to the embodiment.
Figure 8:
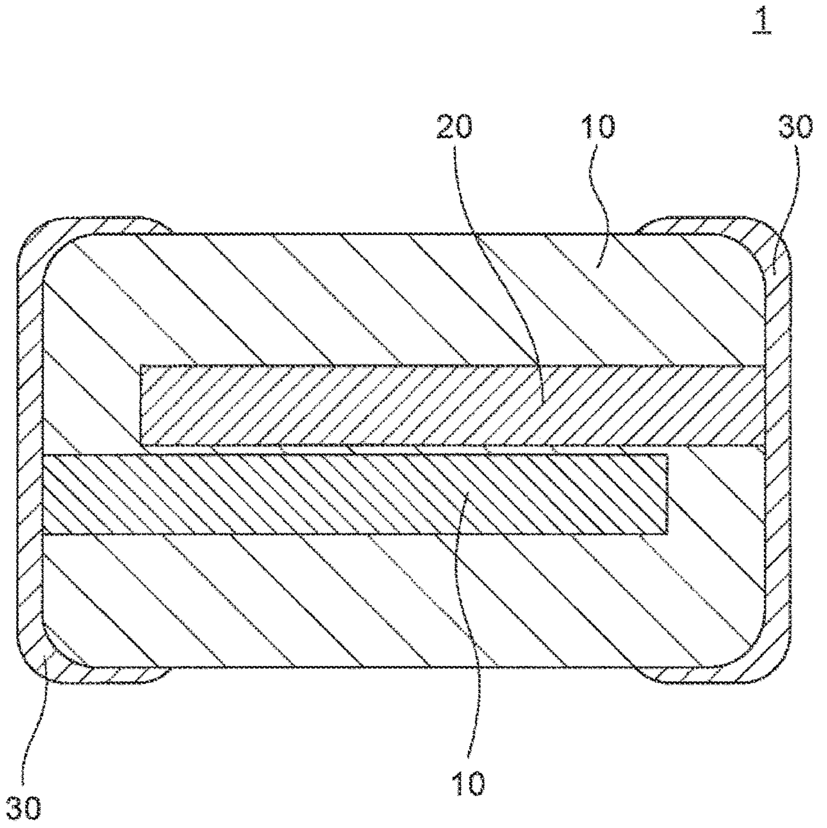
FIG. 8 is a front transparent view of the inductor according to the embodiment.

Next, an inductor including the magnetic compact will be described. First, the method for manufacturing the inductor will be described with reference to FIGS. 6 to 8. FIG. 6 is a process perspective view schematically illustrating the method for manufacturing the inductor according to this embodiment. FIG. 7 is a perspective view of the inductor according to this embodiment. FIG. 8 is a front transparent view of the inductor according to this embodiment.

Method for Manufacturing Inductor

First, a conducting wire 20 to be wound around the magnetic compact is prepared. The conducting wire 20 preferably includes a metal wire (e.g., flat copper wire) covered with a resin or the like. In this case, the conducting wire 20 can be firmly molded in combination with the resin contained in the magnetic compact described above. The conducting wire 20 is preferably wound by alpha winding in which the winding start and the winding end are simultaneously wound outward. Since the winding end is placed on the outside by alpha winding of the conducting wire 20, it is easy to handle the extended portions.

Next, the magnetic compact 10 in which the above resin is uncured or semi-cured is prepared. The conducting wire 20 formed by alpha winding is placed in the magnetic compact 10. In other words, the magnetic compact 10 is disposed at the winding core of the coil conductor. At this time, part of the E-shaped core is inserted at the winding core of the conducting wire 20 (see FIG. 6). Furthermore, the conducting wire 20 may be covered with the above magnetic powder. After the conducting wire 20, the magnetic compact 10, and the magnetic powder are placed in the mold, the mold is then introduced into a press molding machine. The resin contained in the magnetic compact 10 is cured in an environment at about 150° C. or higher and about 200° C. or lower (i.e., from about 150° C. to about 200° C.) at about 5 MPa or more and about 50 MPa or less (i.e., from about 5 MPa to about 50 Mpa) for about 60 seconds or more and about 1800 seconds or less (i.e., from about 60 seconds to about 1800 seconds) to form a base body of the inductor.

Next, the base body may be subjected to barrel polishing to round the edges of the base body. Rounding the edges can prevent breaking of outer electrodes to be formed thereafter. Subsequently, outer electrodes 30 are formed on the base body. The outer electrodes 30 may be formed by a plating method, a method of printing and baking of a conductive paste on the base body, a spattering method, or other methods (see FIGS. 7 and 8). Examples of the outer electrodes 30 include a thermally cured conductive resin paste containing an Ag powder, and a Ni plating and a Sn plating. The outer electrodes 30 may each have a multilayer structure including multiple outer electrodes.

As described above, the inductor can be manufactured by using the magnetic powder and the magnetic compact. In FIG. 7, the cross sections of the conducting wire 20 which intersect the extending direction of the conducting wire 20 is exposed on the surfaces of the base body and connected to the outer electrodes 30. However, the side surfaces of the conducting wire 20 parallel to the extending direction of the conducting wire 20 may be exposed on the surfaces of the base body by bending each end of the conducting wire 20 and connected to the outer electrodes 30.

Examples

Examples of Magnetic Compact

Next, Examples associated with the present disclosure will be described. Magnetic compacts of Examples and Comparative Examples described below were manufactured and subjected to a verification test.

Materials used to manufacture magnetic compacts associated with Examples 1 and 2 and Comparative Examples 1 and 2 are described below. In the method for manufacturing the magnetic compacts in Examples 1 and 2, first, a magnetic powder was manufactured through the step of atomizing a particle material containing first magnetic material particles over second magnetic material particles in an environment at 60° C. as described in the method for manufacturing a magnetic compact according to the embodiment. In Comparative Examples 1 and 2, a resin and a solvent were added to the first magnetic material particles and the second magnetic material particles being stirred in a stirring vessel, and a curing agent and a lubricant were subsequently added to the mixture to form a granulated powder. The granulated powder was dried at 60° C. to evaporate the solvent. In this stage, one particle of the granulated powder contained multiple second magnetic material particles. The granulated powder was thus ground in a grinding machine such that the second magnetic material particles were separated from each other. Coarse particles were removed by sieving as in Examples to provide a magnetic powder. In Examples 1 and 2 and Comparative Examples 1 and 2, the mesh size of the sieve for removing coarse particles was 180 μm.

Next, toroidal ring-shaped magnetic compacts were manufactured by using the magnetic powders of Examples 1 and 2 and Comparative Examples 1 and 2. The method for manufacturing magnetic compacts in Examples and Comparative Examples was as described above in "Method for Manufacturing Magnetic Compact". First, a magnetic powder was pressed in a first mold in an environment at 30° C. and 100 MPa for 10 seconds. Subsequently, the magnetic powder was pressed in a second mold in an environment at 180° C. and 20 MPa for 600 seconds to cure the resin, manufacturing a magnetic compact.

Materials used for the magnetic powders of Examples 1 and 2 and Comparative Examples 1 and 2 are described below.

First magnetic particles: D50 particle size 4.0 μm, Fe-6.7Si-2.5Cr amorphous alloy (Fe:Si:Cr=90.8:6.7:2.5(weight ratio))

Second magnetic particles: D50 particle size 28 μm, Fe-6.7Si-2.5Cr amorphous alloy (Fe:Si:Cr=90.8:6.7:2.5(weight ratio))

Resin: thermosetting epoxy resin
Solvent: acetone
Curing agent: imidazole
Lubricant: nanosilica (diameter ϕ 50 nm) particle shape In the magnetic powder manufactured in Example 1, the weight percentage of the first magnetic particles and the second magnetic particles was 96.0 wt % based on the total weight of the magnetic powder, the weight percentage of the resin and the curing agent was 3.6 wt % based on the total weight of the magnetic powder, and the weight percentage of the lubricant was 0.4 wt % based on the total weight of the magnetic powder. The solvent was used in an amount of 4.6 wt % based on the total weight of the materials (the first magnetic particles, the second magnetic particles, the resin, the solvent, the curing agent, and the lubricant), but evaporated during manufacture of the magnetic powder.

In the magnetic powder manufactured in Example 1, the weight percentage of the first magnetic particles:the weight percentage of the second magnetic particles=25:75, and the weight percentage of the resin:the weight percentage of the curing agent=97.4:2.6.

In the magnetic powder manufactured in Example 2, the weight percentage of the first magnetic particles and the second magnetic particles was 96.5 wt % based on the total weight of the magnetic powder, the weight percentage of the resin and the curing agent was 3.1 wt % based on the total weight of the magnetic powder, and the weight percentage of the lubricant was 0.4 wt % based on the total weight of the magnetic powder. The solvent was used in an amount of 4.1 wt % based on the total weight of the materials, but evaporated during manufacture of the magnetic powder.

In the magnetic powder manufactured in Example 2, the weight percentage of the first magnetic particles:the weight percentage of the second magnetic particles=25:75, and the weight percentage of the resin:the weight percentage of the curing agent=97.4:2.6.

In the magnetic powder manufactured in Comparative Example 1, the weight percentage of the first magnetic particles and the second magnetic particles was 96.0 wt % based on the total weight of the magnetic powder, the weight percentage of the resin and the curing agent was 3.6 wt % based on the total weight of the magnetic powder, and the weight percentage of the lubricant was 0.4 wt % based on the total weight of the magnetic powder. The solvent was used in an amount of 4.6 wt % based on the total weight of the materials, but evaporated during manufacture of the magnetic powder.

In the magnetic powder manufactured in Comparative Example 1, the weight percentage of the first magnetic particles:the weight percentage of the second magnetic particles=25:75, and the weight percentage of the resin:the weight percentage of the curing agent=97.4:2.6.

In the magnetic powder manufactured in Comparative Example 2, the weight percentage of the first magnetic particles and the second magnetic particles was 96.5 wt % based on the total weight of the magnetic powder, the weight percentage of the resin and the curing agent was 3.1 wt % based on the total weight of the magnetic powder, and the weight percentage of the lubricant was 0.4 wt % based on the total weight of the magnetic powder. The solvent was used in an amount of 4.1 wt % based on the total weight of the materials, but evaporated during manufacture of the magnetic powder.

In the magnetic powder manufactured in Comparative Example 2, the weight percentage of the first magnetic particles:the weight percentage of the second magnetic particles=25:75, and the weight percentage of the resin:the weight percentage of the curing agent=97.4:2.6.

In Examples 1 and 2 and Comparative Examples 1 and 2, the cross-sectional SEM images in multiple regions of the magnetic compact were next obtained to determine the area ratios, and the standard deviation of the area ratios was calculated. The results of the standard deviation are shown in Table 1. The method for calculating the standard deviation was as described above in "Analytical Method for Magnetic Compact". The standard deviation was obtained from measurements at randomly selected 10 positions in the magnetic compact.

TABLE 1

| | Standard Deviation of Area Ratio |
|---|---|
| Example 1 | 0.34 |
| Example 2 | 0.40 |
| Comparative Example 1 | 0.52 |
| Comparative Example 2 | 0.63 |

From the results in Table 1 above, the standard deviations in Example 1 and Example 2 were smaller than those in Comparative Example 1 and Comparative Example 2. In other words, the standard deviations of the magnetic compacts of Comparative Example 1 and Comparative Example 2 were higher than 0.40, and the standard deviations of the magnetic compacts of Example 1 and Example 2 were lower than or equal to 0.40.

Next, the relative magnetic permeability of the magnetic compacts of Examples 1 and 2 and Comparative Examples 1 and 2 was measured. The relative magnetic permeability was measured by using an impedance analyzer (E4294A available from Keysight) at a frequency of 1 MHz. The results of the relative magnetic permeability are shown in Table 2. The term "relative magnetic permeability" as used herein refers to the ratio of the magnetic permeability $\mu$ of a substance to the magnetic permeability $\mu_0$ of the vacuum: $\mu s=\mu/\mu_0$.

TABLE 2

| | Relative Magnetic Permeability |
|---|---|
| Example 1 | 25.2 |
| Example 2 | 24.3 |
| Comparative Example 1 | 23.2 |
| Comparative Example 2 | 23.1 |

From the results in Table 2 above, the relative magnetic permeability in Example 1 and Example 2 was higher than that in Comparative Example 1 and Comparative Example 2. In other words, the relative magnetic permeability of the magnetic compacts of Comparative Example 1 and Comparative Example 2 was lower than 23.5, and the relative magnetic permeability of the magnetic compacts of Example 1 and Example 2 was higher than or equal to 23.5. More specifically, the relative magnetic permeability of the inductors of Example 1 and Example 2 was higher than or equal to 24.

The embodiments disclosed herein are for illustrative purposes in any respect and should not be construed as limiting. The technical scope of the present disclosure is not understood only from the embodiments described above and is defined on the basis of the description of the claims. The technical scope of the present disclosure includes all modifications within the meaning and range of equivalency of the claims.

Since the magnetic compact and the inductor according to the present disclosure achieve high magnetic permeability, they can be suitably used for electronic components requiring good magnetic characteristics.

While preferred embodiments of the disclosure have been described above, it is to be understood that variations and modifications will be apparent to those skilled in the art without departing from the scope and spirit of the disclosure. The scope of the disclosure, therefore, is to be determined solely by the following claims.

What is claimed is:

1. A magnetic compact comprising:
first magnetic particles;
second magnetic particles with larger particle sizes than the first magnetic particles; and
a resin,
wherein area ratios of the first and second magnetic particles calculated at a plurality of predetermined regions of the magnetic compact have a standard deviation of 0.40 or less, where
area ratio=(total area of the first magnetic particles)/(total area of the second magnetic particles),
the second magnetic particles have a particle size of from 10 to 28 μm, and
the first and second magnetic particles are iron-based particles,
wherein each of the predetermined regions is a region 10×D in length and 7.5×D in width, where D is a particle size corresponding to a bottom value representing a minimum particle frequency between a first peak value of the first magnetic particles and a second peak value of the second magnetic particles in a particle size distribution indicating a correlation between a particle frequency and a particle size.

2. The magnetic compact according to claim 1, wherein the standard deviation is 0.34 or less.

3. The magnetic compact according to claim 1, wherein the first magnetic particles and the second magnetic particles are metal magnetic particles.

4. The magnetic compact according to claim 3, wherein the metal magnetic particles contain at least one selected from the group consisting of Fe, an alloy containing Fe and Ni, an alloy containing Fe and Co, an alloy containing Fe and Si, an alloy containing Fe, Si, and Cr, an alloy containing Fe, Si, B, and Cr, and an alloy containing Fe, P, Cr, Si, B, Nb, and C.

5. The magnetic compact according to claim 1, wherein the resin is a thermosetting resin.

6. An inductor comprising:
a coil conductor; and
the magnetic compact according to claim 1, which defines a winding core of the coil conductor.

7. The magnetic compact according to claim 2, wherein the resin is a thermosetting resin.

8. The magnetic compact according to claim 3, wherein the resin is a thermosetting resin.

9. The magnetic compact according to claim 4, wherein the resin is a thermosetting resin.

10. An inductor comprising:
a coil conductor; and
the magnetic compact according to claim 2, which defines a winding core of the coil conductor.

11. An inductor comprising:
a coil conductor; and
the magnetic compact according to claim 3, which defines a winding core of the coil conductor.

12. An inductor comprising:
a coil conductor; and
the magnetic compact according to claim 4, which defines a winding core of the coil conductor.

13. An inductor comprising:
a coil conductor; and
the magnetic compact according to claim 5, which defines a winding core of the coil conductor.

* * * * *